June 21, 1960　　　H. T. HALL　　　2,941,250
REACTION VESSEL
Filed Aug. 9, 1955

Inventor:
Howard Tracy Hall,
by Paul A. Frank
His Attorney.

2,941,250
Patented June 21, 1960

2,941,250
REACTION VESSEL

Howard Tracy Hall, Niskayuna, N.Y., assignor to General Electric Company, a corporation of New York Filed Aug. 9, 1955, Ser. No. 527,259

4 Claims. (Cl. 18—34)

My invention relates to reaction vessels and more particularly to such vessels which are subjected to high temperature and high pressure conditions for prolonged periods of time.

In my copending application Serial No. 488,050, filed February 14, 1955 and assigned to the same assignee as the present invention, an apparatus is described and claimed to effect and control reactions which occur at temperatures of the order of several thousand degrees centigrade and pressures of 40,000 to 100,000 atmospheres for long time intervals. Such apparatus comprises a reaction vessel which is positioned within a pressure resisting member between a pair of opposed dies to provide a specimen chamber to be subjected to high temperature and high pressure conditions.

A leak-proof reaction vessel which is capable of encasing a liquid at high temperatures and high pressures is desirable to determine the effects of these conditions on the liquid. However, it was previously necessary to solder or braze end covers to a liquid container to prevent leakage. Liquid contents were adversely affected by the soldering heat while thin container material was often destroyed. Such a soldering step was also difficult to use in smaller capsules. The invention of the present application eliminates the welded construction of previous devices to provide a novel liquid reaction vessel.

Accordingly, it is an object of my invention to provide a new and improved liquid reaction vessel.

It is another object of the invention to provide an improved liquid reaction vessel which may be subjected to high temperatures and high pressures without leakage.

It is a further object of the invention to provide an improved liquid reaction vessel which is easily assembled and disassembled.

In carrying out my invention in one form a tube with a plug at each end is positioned between a pair of electrically conductive discs and surrounded by an electrically insulating cylinder to provide a reaction vessel which is adapted to contain a liquid for subjection to high temperature and high pressure conditions.

Figure 1:
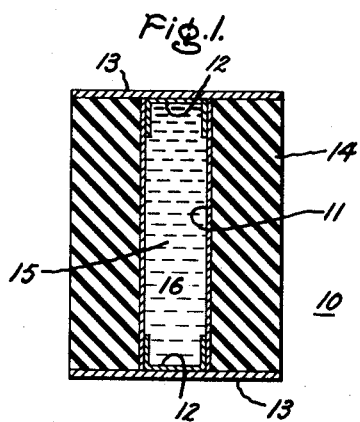
Figure 2:
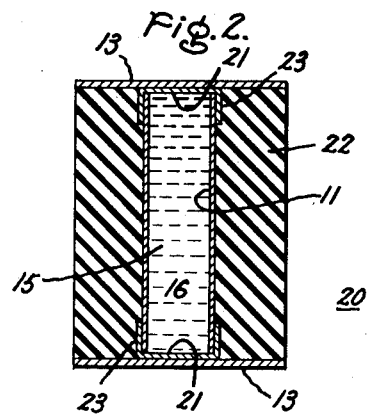

These and various other objects, features and advantages of the invention will be better understood from the following description taken in connection with the accompanying drawing in which:

Fig. 1 is a sectional view of a reaction vessel which embodies my invention; and Fig. 2 is a sectional view of a modified reaction vessel.

In Fig. 1 of the drawing, a reaction vessel 10 is shown which comprises a hollow tube 11 with a plug or cap 12 at each end to seal the structure. Each plug 12 is preferably in the form of a cup which fits tightly within the end of tube 11 and has its outer surface flush with the tube edges. Both tube 11 and plug 12 are composed of electrically conducting material, such as, metal or graphite. A pair of electrically conducting end discs 13 are coaxially positioned over opposite closed ends of tube 11 while an electrically insulating cylinder 14 surrounds the periphery of tube 11 between discs 13. Cylinder 14 may be composed of suitable materials, such as, pyrophyllite or catlinite. Between plugs 12, tube 11 has a space 15 which is adapted to contain a liquid or semi-liquid sample 16 to be subjected to high temperature and high pressure conditions. I have discovered that reaction vessel 10 provides a leak-proof container for liquids at both atmospheric and higher pressures.

Reaction vessel 10 is assembled by placing one plug 12 in the end of tube 11 and by setting tube 11 on an end disc 13. Cylinder 14 is then placed around the periphery of tube 11. After space 15 is filled with a liquid or semi-liquid sample 16, a plug 12 is inserted in the upper end of tube 11 and an end disc 13 is placed over plug 12. Reaction vessel 10 is then subjected to any desired high temperature and high pressure conditions in an apparatus such as set forth in my above-identified application. An electrical circuit is established from a source of power in such an apparatus through end discs 13 to tube 11 and plugs 12 to generate heat in sample 16. Cylinder 14 confines heat and pressure within tube 11 during the operation of the high temperature high pressure apparatus. When vessel 10 is subjected to high temperature high pressure conditions, I have found that no fluid will leak from the ends of tube 11. However, if a liquid of low surface tension is employed in space 15, the liquid tends to leak from tube 11 at atmospheric pressure while such leakage does not occur at higher pressure. Accordingly, I prefer to seal lower end plug 12 to tube 11 with a suitable adhesive material, such as, water glass, glyptol or cement. The use of such an adhesive does not interfere with the liquid in space 15. After reaction vessel 10 has been subjected to high temperature and high pressure conditions either one or both plugs 12 are easily removed to provide access to the sample therein.

In Fig. 2 of the drawing, a modified reaction vessel 20 is shown which comprises a hollow tube 11 with a plug or cap 21 over the outer edge of each end to provide a closed structure. A pair of end discs 13 are positioned over the opposite closed ends of tube 11 while an electrically insulating cylinder 22 surrounds the periphery of tube 11 between discs 13. Cylinder 22 is recessed at 23 to fit against the side wall of each end plug 21. Reaction vessel 20 is assembled in a manner similar to that which was described for Fig. 1 with the exception that end plugs 21 are positioned around the outer diameter of tube 11. Such a vessel may also be subjected to any desired high temperature and high pressure range.

As will be apparent to those skilled in the art, the objects of my invention are attained by the use of a tube with end plugs which is positioned between a pair of electrically conductive end discs and surrounded by an insulating cylinder to provide a reaction vessel for subjection to high temperature and high pressure conditions.

While other modifications of this invention and variations of apparatus have not been described, the invention is intended to include all such as may be embraced within the following claims.

What I claim as new and desire to secure by Letters Patent of the United States is:

1. A reaction vessel comprising a pair of coaxially spaced electrically conductive discs, a hollow electrically conductive tube adpted to contain a specimen to be subjected to high temperature high pressure conditions positioned between and in contact with said discs, a sealing plug located adjacent each end of and frictionally engaging the wall of said tube, and an insulating cylinder around said tube between said discs and in contact with said tube and said discs.

2. A reaction vessel comprising a pair of coaxially spaced electrically conductive discs, a hollow electrically conductive tube adapted to contain a liquid specimen to be subjected to high temperature high pressure conditions positioned between and in contact with said discs, an insulating cylinder around said tube in contact therewith and with said discs, and an electrically conductive cup-shaped sealing plug located within and frictionally engaging said tube adjacent each end thereof with the open end of said plug inserted into said tube, such that pressure generated at said specimen forces the said lips of said cups into closer engagement with said tube to provide a leak-proof vessel.

3. A reaction vessel comprising a pair of coaxially spaced electrically conductive discs, a hollow electrically conductive tube adapted to contain a liquid specimen to be subjected to high temperature high pressure conditions positioned between and in contact with said discs, an insulating cylinder around said tube between and contacting said discs and said tube, and an electrically conductive sealing cup positioned over the outer edge of each end of said tube so that the pressure generated in the liquid forces the lips of said cups into closer engagement with said tube to provide a leak-proof vessel.

4. A reaction vessel comprising in combination an electrically conductive tube, an electrical insulating cylinder adjacent to and encircling said tube, a pair of electrically conductive discs, a cup-shaped sealing plug centrally attached to one of the flat surfaces on each of said discs with the lips of the said cup-shaped plugs extending from the said disc surface, one of said discs and cups being mounted on one end of said tube and cylinder with the extending lip of said cup in sliding engagement with said tube, said lip and said tube being adhesively joined to contain a liquid specimen in said tube, the other of said discs and said cup being mounted on the other end of said tube with the said lips and the said tube being in sliding and in frictional engagement, whereby pressure generated in said liquid forces the said lips of the said cups into close engagement with said tube to provide a leak-proof vessel.

References Cited in the file of this patent

UNITED STATES PATENTS

| | | |
|---|---|---|
| 1,371,299 | Claude | Mar. 15, 1921 |
| 1,918,064 | Taylor | July 11, 1933 |
| 2,149,596 | Gillett et al. | Mar. 7, 1939 |
| 2,195,297 | Engle | Mar. 26, 1940 |
| 2,519,770 | Kramer | Aug. 22, 1950 |
| 2,544,414 | Bridgman et al. | Mar. 6, 1951 |
| 2,547,521 | Buehler | Apr. 3, 1951 |
| 2,554,499 | Poulter | May 29, 1951 |

FOREIGN PATENTS

| | | |
|---|---|---|
| 572,751 | Great Britain | Oct. 22, 1945 |

OTHER REFERENCES

Bridgman: "Proceedings of the American Academy of Arts and Sciences," vol. 81, No. 4, pp. 169–184, March 1952. (Copy in Sci. Libr.)

Parsons: "Phil. Trans. of the Roy. Society," vol. 220, Series A (1919), pages 67–75, 8587, 92–101. (Copy in Sci. Libr.)

Gunther et al.: "Z. Anorg. Allgem. Chem.," vol. 250, pages 357–372 (1943). (Copy in Sci. Lib.)

Bridgman: "J. Chem. Physics," vol. 15, No. 2 (February 1947), pages 92–98. (Copy in Sci. Lib.)